(12) United States Patent
Seda

(10) Patent No.: US 10,427,826 B1
(45) Date of Patent: Oct. 1, 2019

(54) REUSABLE JUG

(71) Applicant: Haggai Seda, Jacksonville Beach, FL (US)

(72) Inventor: Haggai Seda, Jacksonville Beach, FL (US)

( * ) Notice: Subject to any disclaimer, the term of this patent is extended or adjusted under 35 U.S.C. 154(b) by 0 days.

(21) Appl. No.: 15/615,133

(22) Filed: Jun. 6, 2017

(51) Int. Cl.
| | |
|---|---|
| *B65D 1/06* | (2006.01) |
| *B65D 81/32* | (2006.01) |
| *B65D 51/28* | (2006.01) |
| *B65D 1/20* | (2006.01) |
| *A47G 19/22* | (2006.01) |
| *B65D 23/10* | (2006.01) |
| *B65D 25/28* | (2006.01) |
| *B65D 77/06* | (2006.01) |
| *B65D 1/04* | (2006.01) |
| *B65D 25/00* | (2006.01) |

(52) U.S. Cl.
CPC ............ *B65D 1/20* (2013.01); *A47G 19/2205* (2013.01); *B65D 1/04* (2013.01); *B65D 1/06* (2013.01); *B65D 23/102* (2013.01); *B65D 25/2885* (2013.01); *B65D 51/28* (2013.01); *B65D 77/06* (2013.01); *B65D 81/3216* (2013.01); *B65D 25/00* (2013.01); *B65D 2251/0003* (2013.01)

(58) Field of Classification Search
CPC ...... B65D 81/32; B65D 81/3216; B65D 1/04; B65D 1/06; B65D 21/0237; B65D 2251/003; B65D 2251/0015; B65D 2251/0078; B65D 51/28; Y10S 220/916
USPC .......................... 220/254.1, 254.8, 504, 506
See application file for complete search history.

(56) References Cited

U.S. PATENT DOCUMENTS

| | | | | |
|---|---|---|---|---|
| 2,385,648 | A * | 9/1945 | Prager | B65D 51/28 206/221 |
| 2,412,833 | A * | 12/1946 | Prager | B65D 51/28 215/6 |
| 4,342,337 | A * | 8/1982 | Underwood | B65D 59/00 138/109 |
| 4,813,569 | A * | 3/1989 | Ruiz | F16L 55/1108 138/89 |
| 4,899,904 | A * | 2/1990 | Dooley | A45C 11/20 206/545 |
| 5,211,206 | A * | 5/1993 | LaBonte | B65D 51/28 138/89 |
| 6,672,817 | B2 * | 1/2004 | Denny | A47G 19/22 426/110 |
| 7,614,512 | B2 | 11/2009 | Nader | |
| 9,360,248 | B1 | 6/2016 | Efferding | |
| 9,950,827 | B1 * | 4/2018 | Lau | B65D 1/04 |
| 2005/0224442 | A1 * | 10/2005 | White | B65D 1/04 215/6 |
| 2007/0051689 | A1 * | 3/2007 | Anderson | B65D 51/28 215/228 |

(Continued)

FOREIGN PATENT DOCUMENTS

| | | | | |
|---|---|---|---|---|
| CA | 2718380 A1 * | 4/2012 | ............ | B65D 1/04 |
| DE | 1782336 A1 * | 9/1971 | ............ | B65D 1/06 |
| EP | 1452455 A1 * | 9/2004 | ............ | B65D 11/04 |

*Primary Examiner* — Mollie Impink
(74) *Attorney, Agent, or Firm* — Mitchell Ghaneie

(57) ABSTRACT

This reusable jug allows for storage within attachable pockets, an internal receptacle, or both. Many individuals that routinely exercise carry gallon jugs with them throughout her or his day to stay hydrated. This invention allows each individual to reuse their jug after each use while also utilizing the jug to carry personal items.

14 Claims, 5 Drawing Sheets

(56) References Cited

U.S. PATENT DOCUMENTS

2010/0308006 A1 12/2010 Walker-Smith
2016/0311575 A1* 10/2016 Huang .................... B62J 11/00

* cited by examiner

REUSABLE JUG

BACKGROUND OF THE INVENTION

A. Field of the Invention

This invention is a reusable jug that provides pockets and an internal receptacle. The bottom of the jug provides a removable cap as well as a receptacle that can house various personal items.

B. Prior Art

Typically, reusable jugs and containers allow for cleaning by removing a top cap. The jug or container is then inverted and placed in a dishwasher or a user places brushes within the top opening of the jug to clean the interior of the jug. Also unlike the present invention, jugs within the prior art do not provide pockets attached to the exterior or provide an internal receptacle that is accessible without having to expose the drinkable contents within the jug.

There are many distinguishing factors between the present invention and other previously disclosed jug or containers. Accordingly, the reusable jug described herein is a unique and novel invention.

BRIEF SUMMARY OF THE INVENTION

The present invention is a reusable jug or container that provides at least one pocket, a top cap, a large bottom cap, a small bottom cap, and an interior receptacle. While this invention is shown and described as having only one pocket, additional pockets may be provided on other areas of the jug. Additionally, more than one pocket may be provided on a side of a jug. The pockets may also be removable.

The bottom large cap and a bottom small cap are provided on the bottom of the jug. The bottom large cap threads into the reusable jug and seats against a first seal. The first seal prevents water from leaking through the bottom large cap. The bottom small cap threads into the bottom large cap. The interior receptacle also threads into the bottom large cap against a second seal to prevent water from leaking into the receptacle or out of the small cap.

The user can clean the reusable jug after use by removing the large cap. The user can also gain access to the internal receptacle by removing the small bottom cap or the large bottom cap. The internal receptacle can operate as a dry storage compartment or as an ice chamber for maintaining the contents of the jug at a cool temperature.

BRIEF DESCRIPTION OF THE DRAWINGS

FIG. 4 additionally shows a first seal and a second seal, which help insure liquid within the jug does not leak outside through the threads of the large bottom cap. The top cap is threaded onto the top opening of the jug.

NUMBER REFERENCES

Figure 1:
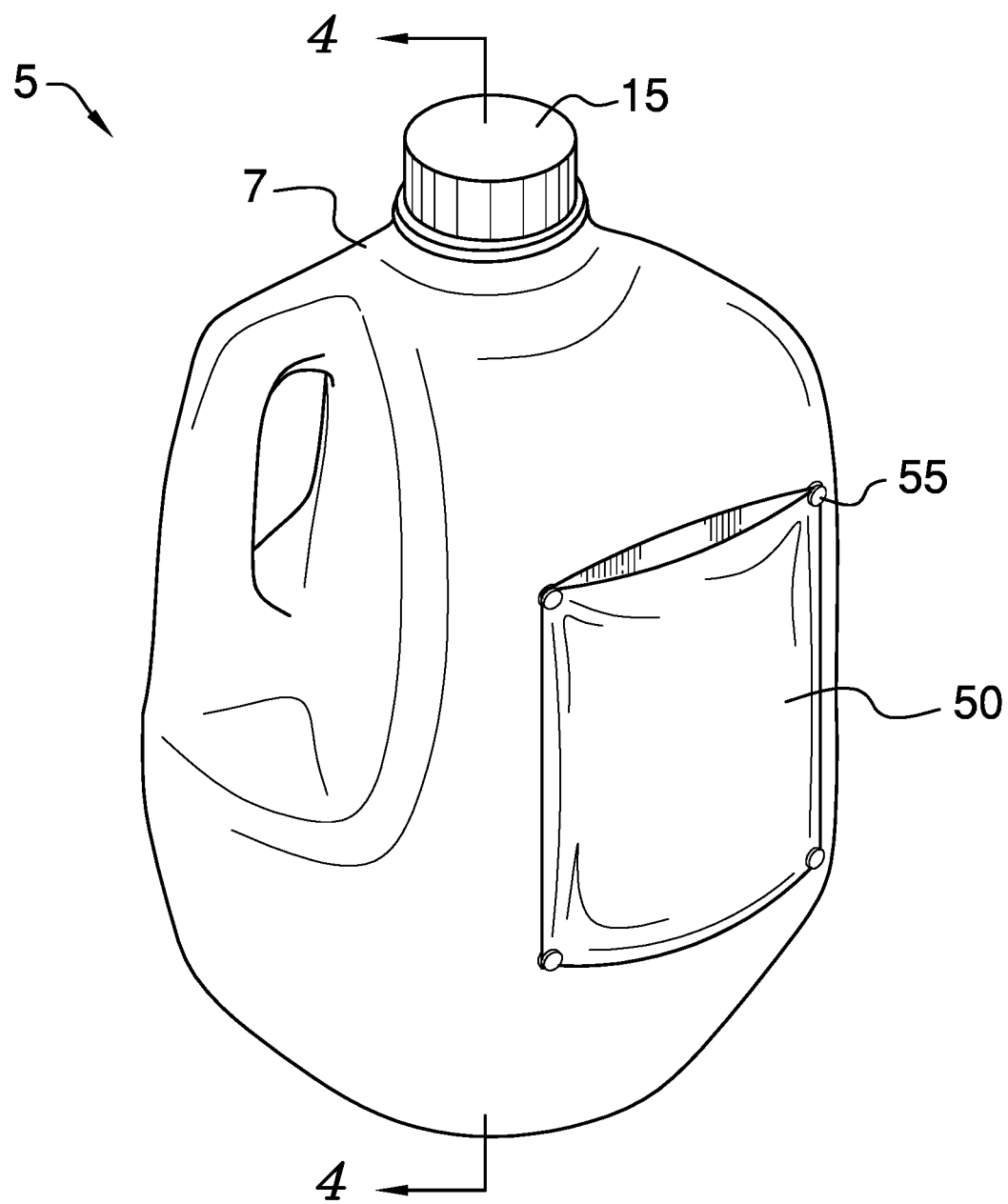
FIG. 1 is a top isometric view of the jug, which shows the top cap and pocket that is attached to the jug with a plurality of screws.
Figure 2:
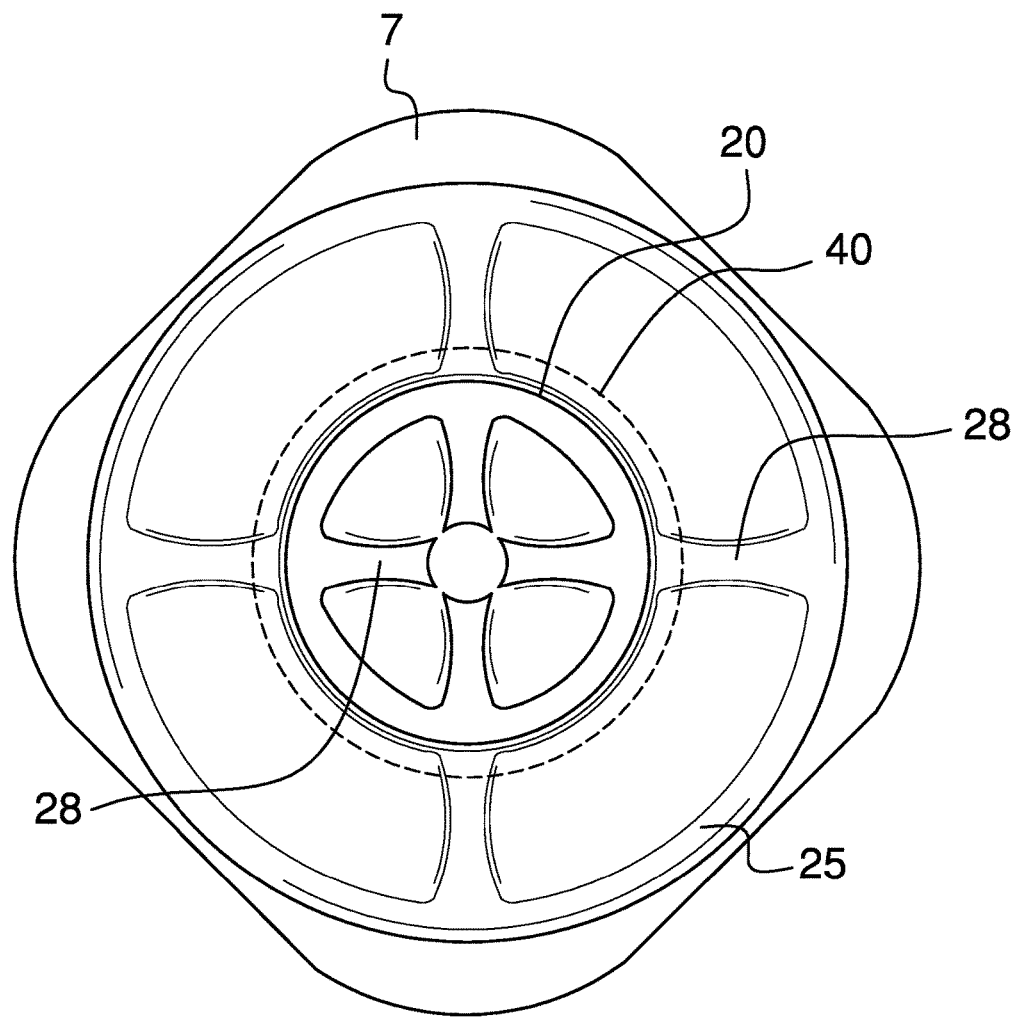
FIG. 2 is a bottom view of the jug, which shows the bottom large cap and the bottom small cap. The interior receptacle is shown in dotted lines.
Figure 3:
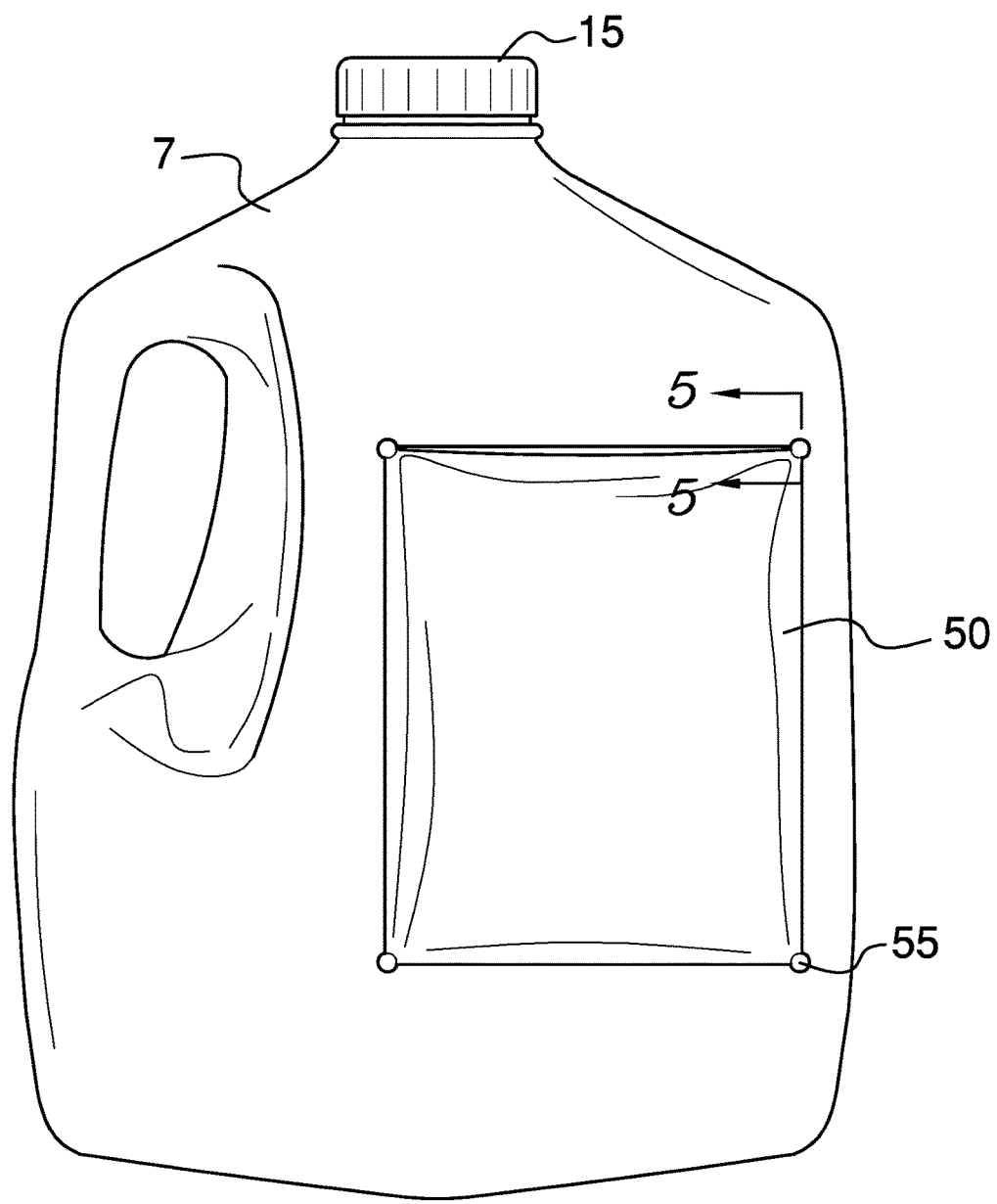
FIG. 3 is a side view of the jug, which shows the pocket secured to the side of the jug with a plurality of screws and the top cap secured to the top of the jug.

5—Device
7—Jug
10—Jug wall
15—Top cap
20—Small bottom cap
25—Large bottom cap
28—Grips
30—First seal
35—Second seal
40—Internal receptacle
43—Threads
45—Threaded insert
50—Pocket
55—Screw

DETAILED DESCRIPTION

This device 5 is a reusable jug, which is described in four separate embodiments: The first embodiment provides a jug 7, large bottom cap 25 that threads into the bottom of the jug 7; the second embodiment provides a jug 7, large bottom cap 25 and a plurality of pockets 50 that attach to the side of the jug 7; the third embodiment provides an internal receptacle 40 that attaches to the bottom large cap 25, which is contained within the jug 7 and a small bottom cap 20; the fourth embodiment provides a jug 7, a large bottom cap 25, an internal receptacle 40, a small bottom cap 20, and a plurality of pockets 50. Each embodiment is described respectively below in greater detail.

First Embodiment

The first embodiment is comprised of a jug 7, a top cap 15, a large bottom cap 25, and a first seal 30. The top cap 15 covers a hole in the top of the device 5, which is typically used to drink or pour out of. While it is not shown, it is anticipated that the top cap 15 is attached to the device 5 even when it is not threaded onto the top opening like other reusable containers.

Figure 4:
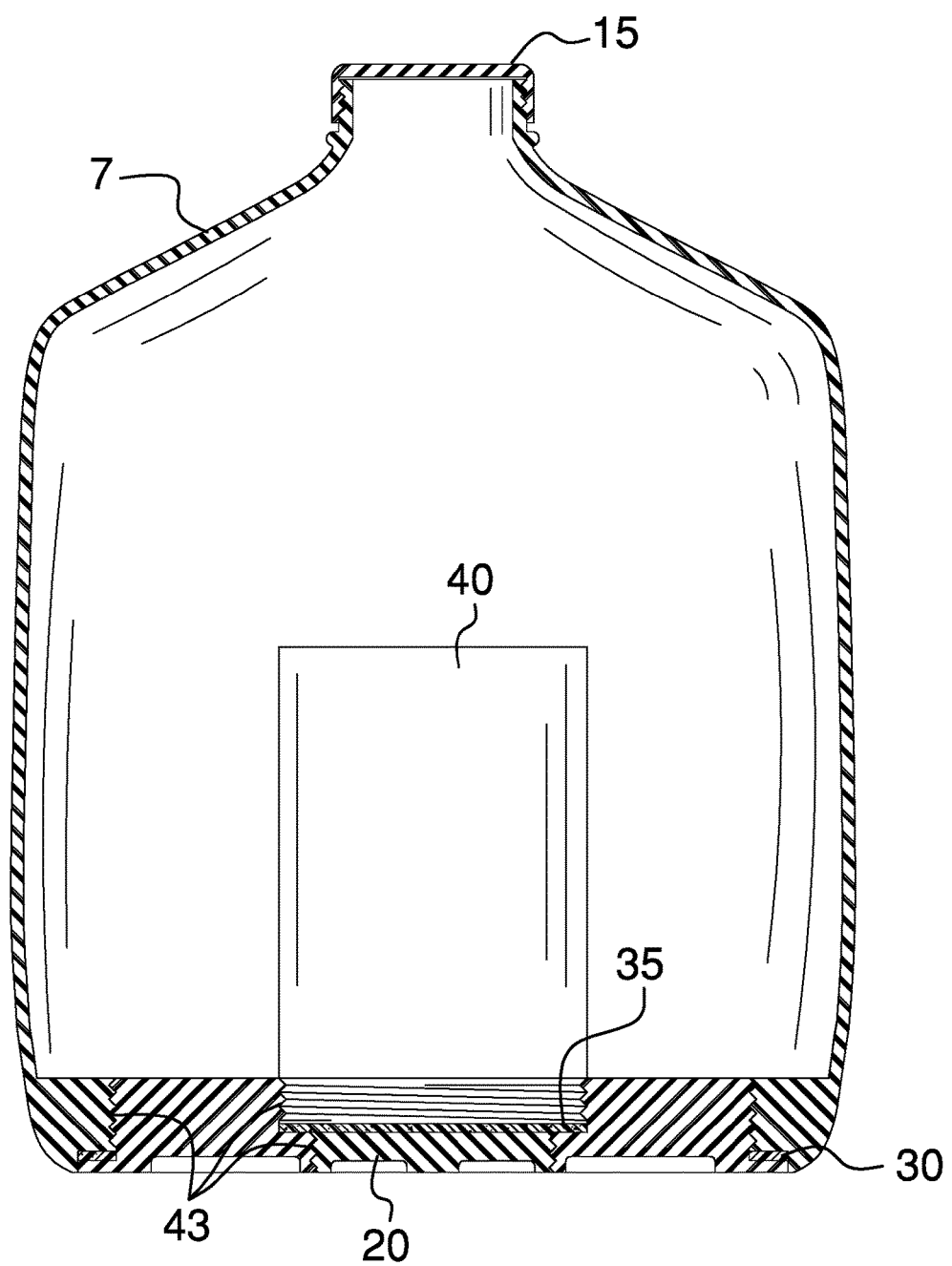
FIG. 4 is a cross-sectional view from FIG. 1, which shows the bottom large cap threaded into the bottom section of the jug, the bottom small cap threaded into the bottom large cap, and the internal receptacle threaded into the bottom large cap.

The large bottom cap 25 provides a set of male threads that mate with a set of female threads provided on the bottom of the device as shown in FIG. 4. A first seal 30 is provided between the large bottom cap and the jug 7. The first seal helps ensure that liquid within the jug 7 does not leak out while the device 5 is in use.

The large bottom cap 25 can be removed as the user desires for easy cleaning. The diameter of the cap 25 is intended to be large enough for a person to fit her or his hand in the jug 7 to clean it for later use. Grips 28 are provided on the large cap 25 to assist with tightening the cap 25 onto the jug 7 or removing the cap 25 from the jug 7.

Second Embodiment

The second embodiment is comprised of a jug 7, a top cap 15, a large bottom cap 25, a first seal 30, a plurality of threaded inserts 45, at least one pocket 50, and a plurality of screws 55. The top cap 15, large bottom cap 25, and first seal 30 are utilized as described in the first embodiment.

Figure 5:
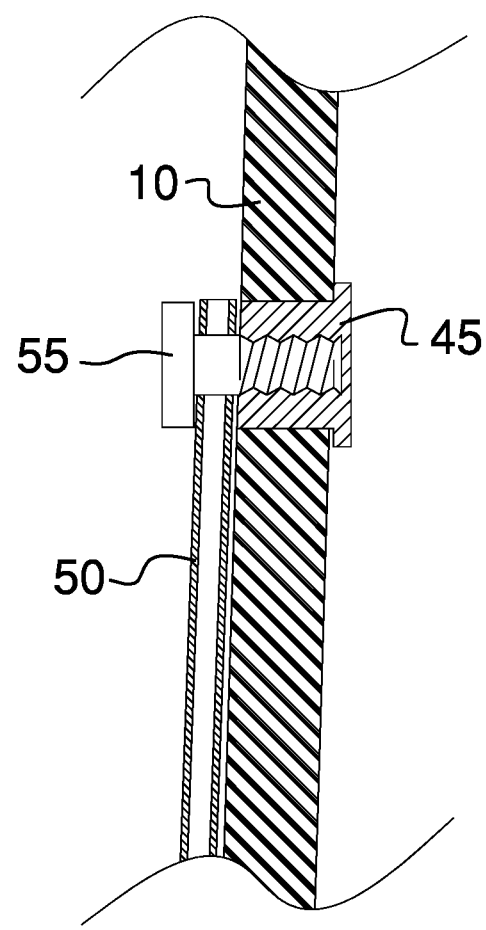
FIG. 5 is a cross-sectional view from FIG. 3, which shows the wall of the gallon jug, the threaded insert within the wall of the jug, the pocket, and the screw that threads into the threaded insert thereby affixing the pocket to the jug.

In this second embodiment, the plurality of threaded inserts 45 is placed into the wall 10 of the jug 7 as shown in FIG. 5. The at least one pocket 50 is then attached to the side of the jug 7 with a plurality of screws 55, which is shown in FIG. 1. Each screw 55 of the plurality of screws 55 are threaded into a respective threaded insert 45, which is also shown in FIG. 5.

Third Embodiment

The third embodiment is comprised of a jug 7, a top cap 15, a small bottom cap 20, a large bottom cap 25, a first seal 30, a second seal 35, and an internal receptacle 40. The internal receptacle 40 can be utilized as a dry storage compartment for personal items such as keys, snacks, protein powder, tubes containing work out supplements, or liquid workout supplements as well as an ice chamber.

The internal receptacle 40 provides a set of male threads 43 that mate with a corresponding set of female threads 43 placed on the large bottom cap 25, which is shown in FIG. 4. Alternatively, from the first and second embodiments, the large bottom cap 25 has an opening that provides a second set of female threads 43. A small bottom cap 20 provides a set of male threads 43 that mate with the corresponding second set of female threads 43, which is also shown in FIG. 4.

A second seal 35 is placed at the bottom of the first set of female threads 43 as shown in FIG. 4. The second seal 35 prevents water or other liquid from leaking between the threads of the large bottom cap 25 and the internal receptacle 40. The small bottom cap 20 provides access to the internal receptacle 40, without having to remove the large bottom cap 25.

The internal receptacle 40 could operate as an ice chamber by placing water into the receptacle 40 and freezing the water. Accordingly, it is anticipated that the internal receptacle 40 could have its own designated cap. In other words, it is anticipated that a third cap (not shown) can be provided. A third seal (not shown) could also be provided between the third cap and the internal receptacle 40, which would prevent any liquid inside the receptacle from leaking out through the small bottom cap 20. Once the water is frozen, the receptacle 40 can be capped with the third cap (not shown) and threaded into the first female threads 43 provided on the large bottom cap 25.

Alternatively, the small bottom cap 20 could be modified to extend into the opening of the receptacle 40 against a third seal (not shown) thereby closing the receptacle 40 and thus preventing the potential for liquid to leak out of the receptacle.

Fourth Embodiment

This fourth embodiment provides features discussed in both the second embodiment and the third embodiment. Thus, the jug disclosed in the fourth embodiment is comprised of a jug 7, a top cap 15, a small bottom cap 20, a large bottom cap 25, a first seal 30, a second seal 35, an internal receptacle 40, at least one threaded insert 45, at least one pocket 50, and at least one screw 55.

This will allow a user to store personal items such as a phone or keys in a pocket 50 on the side of the jug 7. This embodiment will additionally allow the user to store items in the internal receptacle 40 or utilize the internal receptacle 40 as an ice chamber.

While the embodiments of the invention have been disclosed, certain modifications may be made by those skilled in the art to modify the invention without departing from the spirit of the invention.

The inventor claims:

1. A device, which is comprised of:
    a. a jug;
        wherein the jug has a top opening and a bottom opening;
        wherein a set of female threads are provided on the bottom opening of the jug;
        wherein a set of male threads are provided on the top opening of the jug;
    b. a top cap;
        wherein the top cap provides female threads;
        wherein the top cap threads over the male threads of the top opening of the jug;
    c. a large bottom cap;
        wherein the large bottom cap provides a set of male threads;
        wherein the large bottom cap provides a first set of female threads;
        wherein the large bottom cap provides a second set of female threads;
        wherein the large bottom cap threads into the bottom opening of the jug;
        wherein the large bottom cap has an opening;
        wherein the first set of female threads are provided within the opening;
    d. a small bottom cap;
        wherein the small bottom cap has a set of male threads;
        wherein the male threads of the small bottom cap thread into the first set of female threads of the large bottom cap;
    e. an internal receptacle;
        wherein the internal receptacle has male threads;
        wherein the internal receptacle threads into the second set of female threads of the large bottom cap;
    f. a first seal;
        wherein the first seal is provided between the large bottom cap and the bottom opening of the jug;
    g. a second seal;
        wherein the second seal is provided between the large bottom cap and the internal receptacle.

2. The device as described in claim 1 wherein the small bottom cap threads into the internal receptacle.

3. The device as described in claim 1 wherein the small bottom cap closes the internal receptacle.

4. The device as described in claim 1 wherein a plurality of grips is provided on the large bottom cap.

5. The device as described in claim 1 wherein a plurality of grips is provided on the small bottom cap.

6. The device as described in claim 1 wherein a handle is provided on the jug.

7. A device, which is comprised of:
    a. a jug;
        wherein the jug has a top and a bottom;
        wherein the jug has a jug wall;
        wherein at least one threaded insert is placed within the jug wall;
        wherein the top of the jug has a top opening;
        wherein the top opening has male threads;
    b. at least one pocket;
        wherein the at least one pocket is attached to the wall of the jug;
    c. at least one screw;

wherein the at least one screw threads into a corresponding threaded insert, thereby attaching the at least one pocket to the jug;
d. a top cap;
   wherein the top cap has female threads;
   wherein the top cap threads over the top opening of the jug.

8. The device as described in claim 7 wherein the jug is further comprised of:
a. a bottom opening;
b. a set of female threads;
   wherein the set of female threads is provided within the bottom opening of the jug.

9. The device as described in claim 8 wherein it is further comprised of:
a. a large bottom cap;
   wherein the large bottom cap provides a set of male threads;
   wherein the large bottom cap has an opening;
   wherein the large bottom cap provides a first set of female threads;
   wherein the large bottom cap provides a second set of female threads;
   wherein the first set of female threads are provided within the opening;
   wherein the large bottom cap threads into the bottom opening of the jug;
b. a small bottom cap;
   wherein the small bottom cap has a set of male threads;
   wherein the male threads of the small bottom cap thread into the first set of female threads of the large bottom cap;
c. an internal receptacle;
   wherein the internal receptacle has male threads;
   wherein the internal receptacle threads into the second set of female threads of the large bottom cap;
d. a first seal;
   wherein the first seal is provided between the large bottom cap and the bottom opening of the jug;
e. a second seal;
   wherein the second seal is provided between the large bottom cap and the internal receptacle.

10. The device as described in claim 9 wherein the small bottom cap threads into the internal receptacle.

11. The device as described in claim 9 wherein the small bottom cap closes the internal receptacle.

12. The device as described in claim 9 wherein a plurality of grips is provided on the large bottom cap.

13. The device as described in claim 9 wherein a plurality of grips is provided on the small bottom cap.

14. The device as described in claim 9 wherein a handle is provided on the jug.

* * * * *